United States Patent Office 3,141,747
Patented July 21, 1964

3,141,747
ALUMINA ABRASIVE
Douglas W. Marshall, Niagara Falls, Ontario, Canada, assignor to Norton Company, Worcester, Mass., a corporation of Massachusetts
No Drawing. Filed Aug. 24, 1961, Ser. No. 133,569
2 Claims. (Cl. 51—309)

This invention relates to abrasive materials. More particularly, this invention relates to aluminous abrasive materials especially suitable for surface grinding operations.

Alpha-alumina, in the form known and referred to as fused alumina, has been used extensively as an abrasive material for many years. The reason for this extensive use is that alpha-alumina combines the properties of strength and hardness in such a way as to make it suitable for many different abrasive applications. The hardness of alpha-alumina is 9 on the Mohs scale of hardness and the chemical formula is $Al_2O_3$. It has a density of 3.99 grams per cubic centimeter, is crystallized in the rhombohedral system and has a melting point of 2035° C. These characteristics make fused alumina preferable for grinding tough, high tensile strength materials.

In the conventional manufacture of regular fused alumina (described in detail in the Journal of Chemical Education, December 1949, pages 677 to 679), the main raw material is calcined bauxite, the best grades being preferable and running up to about 90% $Al_2O_3$. The preferred particles size of the bauxite ranges from one-half inch down, although too much fine material (−65 M) is not desirable. Reduction of foreign oxides in the bauxite to leave only the desired amounts in the product is carried out by means of coke. Petroleum coke is preferred but metallurgical coke, barley coal and even anthracite may be used. A typical charge might be: calcined bauxite (88–90% purity) 89%, iron borings 9% and petroleum coke 2%. The materials are mixed and fused in, for example, a Higgins water cooled arc furnace, wherein the materials added as the furnace charge are heated to the fusing point and are rendered molten. During the fusion the carbon acts as a reducing agent and partially reduces $SiO_2$, $Fe_2O_3$ and $TiO_2$ initially present in the bauxite, to form a product with an alumina content of 95 to 97% and a ferrosilicon alloy by-product.

The alloys formed by the reduction of the foreign oxides are removed from the molten alumina by iron borings, nail clippings, etc., added to the mix in an amount sufficient to keep the alloy formed magnetic and of greater density than the alumina. The residual foreign oxides left in the molten alumina have a great effect on the structure and properties of the product and hence good control must be maintained on the mixture proportioning and furnacing. The charge is added to the furnace gradually until the furnace is filled with fused alumina and the heavier alloys settle to the bottom. The resulting fused bath is then allowed to cool and solidifies into an ingot of crystalline alumina ranging from dark brown to reddish brown in color. The ingot is then broken up, crushed, and freed as much as possible from iron by magnetic separation. Some of the titanium and lesser amounts of silicon and iron remain in the alumina grain.

Crude abrasive material made by this method is generally slightly stronger and tougher than abrasives of higher purity, i.e., those containing over 99% alumina, and therefore does not fracture as readily as the higher alumina content abrasives. For this reason, regular fused alumina is not a satisfactory abrasive for such operations as surface grinding.

In surface grinding, the material to be ground is mounted on a table which reciprocates under a rotating wheel and the wheel has a peripheral engagement with the work. Ordinarily, a relatively fine cut is taken and a good finish is produced on the surface. Therefore, a satisfactory surface grinding abrasive must be weak enough so that it will fracture and present new cutting edges to the work, yet strong enough so that the abrasive will not wear so fast as to be uneconomical.

It is therefore an object of this invention to provide an improved aluminous abrasive material.

It is another object of this invention to provide an aluminous abrasive material which is especially suitable for surface grinding operations.

It is a further object of this invention to provide a method for the production of an aluminous abrasive wherein the grain strength of the abrasive may be closely controlled.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has been found that the above objects can be attained by adding to a conventional furnace charge for regular fused alumina a controlled amount of a lithia compound such as lithium carbonate. The charge is then fused in the standard manner and a product of lower impact strength than regular fused alumina is obtained. I have also found that by carefully controlling the amount of lithia compound added to the furnace mixture, the strength of the product may be closely controlled so that the most desirable grain strength can be obtained.

Addition of the lithia compound results in formation of small amounts of "zeta-alumina" in the product. This form of alumina, reportedly $Li_2O.5Al_2O_3$, produces a weaker structure in the predominantly alpha-alumina grain.

The amounts of lithia compound combined with alumina to produce the desired grain weakening are comparatively small. The addition may vary from about 0.1 to not more than about 0.5% in lithia content in the combined form of $Li_2O.5Al_2O_3$. When lithium carbonate is used the additions will vary from about 0.25 to about 1.00% of the weight of the furnace charge. These additions give a range of zeta-alumina content in the product varying between 1.8 and 9.0%. The resulting impact "K" value from these products range between .35 and .50 which is the most desirable strength range with this type of abrasive for surface grinding. K is the measure of the amount of breakdown in the abrasive grains caused by impact. The value of K varies inversely with grain strength, a small value indicating a strong grain and a larger value indicating a weaker grain. Larger additions of a lithia compound results in a weakening of the abrasive grain beyond the point where it is a satisfactory surface grinding abrasive. The table below illustrates the results obtained with varying additions of lithia (as lithium carbonate) to regular fused alumina furnace mixtures.

The results listed in the table show that only a small amount of lithia in the product gives the desired strength of grain. In the use of lithium carbonate, an addition of 0.5% by weight of carbonate in the mix gave the best grinding result. With a 1% addition of lithium carbonate the product was still slightly better than regular fused alumina but with a 2% addition of the carbonate the product was much poorer by comparison and very weak.

| Percent LiCO | Percent LiO in Product | Percent Zeta Alumina | Impact "K" | Surface Grinding Comparison with Standard used Alumina Abrasive |
|---|---|---|---|---|
| 0.00 | 0.00 | 0.00 | 0.32 | Standard. |
| 0.25 | 0.09 | 1.62 | .33 | |
| 0.50 | 0.15 | 2.70 | .39 | Much better. |
| 0.75 | 0.25 | 4.50 | .43 | |
| 1.00 | 0.40 | 7.20 | .45 | Slightly better. |
| 2.00 | 0.70 | | .80 | Very poor. |

This table shows that the weakening of the abrasive grain is progressive and is obtained by increasing the lithia content of the product.

The weaker the structure of alumina grain produced according to this invention is due to the presence of the zeta-alumina in the product. Although there is no way of accurately measuring the amount of zeta-alumina in the abrasive, the approximate quantity can be estimated from the lithia content.

As noted above, the process for manufacturing these abrasives is similar to the conventional method for making aluminous abrasives, the same furnace and feeding methods being used. The only difference is that a lithia compound is added to the conventional furnace mixture to obtain the desired lithia content in the fused product.

In the following examples and throughout the specification and claims, all parts are parts by pound weight unless otherwise indicated.

| | Example | | | |
|---|---|---|---|---|
| | 1 | 2 | 3 | 4 |
| Furnace Mix: | | | | |
| Bauxite Ore | 100# | 100# | 100# | 100#. |
| Barley Coal | 1# 3 oz | 1# 3 oz | 1# 3 oz | 1# 5 oz. |
| Iron Borings | 7# | 7# | 7# | 6# 13 oz. |
| Lithium Carbonate | None | 8 oz | 1# | 2#. |

| | Example | | | |
|---|---|---|---|---|
| | 1 percent | 2 percent | 3 percent | 4 percent |
| Product Analyses: | | | | |
| $SiO_2$ | 1.43 | 1.38 | 1.23 | 1.50 |
| $Fe_2O_3$ | 0.24 | 0.26 | 0.21 | 0.10 |
| $TiO_3$ | 3.29 | 3.18 | 2.93 | 3.37 |
| $Al_2O_3$ (by diff.) | 95.04 | 95.03 | 95.23 | 94.33 |
| $Li_2O$ | | 0.15 | 0.40 | 0.70 |
| Impact "K" | .320 | .390 | .450 | .800 |

In the above examples, the ingredients of the furnace mixtures were added to a large arc furnace and heated to the fusing point and rendered molten. The resulting fused bath was allowed to cool. The ingot so produced was crushed to produce abrasive material having the product analyses as indicated.

The furnace mixture for Example 1 is typical for regular fused alumina and this product was used as the test material against which to compare the abrasive products with lithia added. The abrasives produced in Examples 2 and 3 were superior to regular fused alumina in surface grinding, but the product of Example 4 was inferior because of higher lithia content and resultant over weakening of the grain strength for this purpose.

What is claimed is:

1. An aluminous abrasive consisting essentially of a major proportion of fused alpha-alumina and a minor proportion of zeta-alumina, combined lithium being present in said abrasive in an amount of from 1.8 to 9.0% by weight, calculated as zeta-alumina.

2. An aluminous abrasive consisting of about 95% $Al_2O_3$ and including lithium, calculated as $Li_2O$, in an amount of from 0.1 to 0.5%, the remainder accounted for by oxides of iron, titania, and silica.

References Cited in the file of this patent

UNITED STATES PATENTS

| 2,154,069 | Fessler et al. | Apr. 11, 1939 |
| 2,290,878 | Heany | July 28, 1942 |
| 3,003,919 | Broge | Oct. 10, 1961 |

OTHER REFERENCES

Jour. of Am. Ceramic Society, vol. 15, No. 7, pages 362–364 (July 1932).